(12) United States Patent
Sengoku et al.

(10) Patent No.: US 8,447,453 B2
(45) Date of Patent: *May 21, 2013

(54) NAVIGATION DEVICE AND NAVIGATION SYSTEM

(75) Inventors: Koji Sengoku, Minato-ku (JP); Aiko Sugawara, Minato-ku (JP); Masayuki Arai, Wako (JP); Yoshitaka Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 678 days.

This patent is subject to a terminal disclaimer.

(21) Appl. No.: 12/667,412

(22) PCT Filed: Jul. 3, 2008

(86) PCT No.: PCT/JP2008/001763
§ 371 (c)(1),
(2), (4) Date: Dec. 31, 2009

(87) PCT Pub. No.: WO2009/004817
PCT Pub. Date: Jan. 8, 2009

(65) Prior Publication Data
US 2010/0185387 A1    Jul. 22, 2010

(30) Foreign Application Priority Data
Jul. 5, 2007   (JP) .................................. 2007-177291

(51) Int. Cl.
*G01C 22/00*   (2006.01)
(52) U.S. Cl.
USPC ...... 701/23; 701/1; 701/24; 701/25; 701/408; 701/409; 701/410; 701/417; 701/527
(58) Field of Classification Search
USPC ................. 701/400, 408, 409, 410, 411, 412, 701/416, 417, 420, 421, 423, 430, 451–453, 701/461, 462, 463
See application file for complete search history.

(56) References Cited

U.S. PATENT DOCUMENTS 5,703,780 A * 12/1997 Takanabe et al. ............. 701/439
5,938,720 A *  8/1999 Tamai .......................... 701/533
(Continued)

FOREIGN PATENT DOCUMENTS

JP   2000-55682    2/2000
JP   2000-113388   4/2000
(Continued)

OTHER PUBLICATIONS

International Search Report for Application No. PCT/JP2008/001763, dated Oct. 7, 2008.

*Primary Examiner* — Khoi Tran
*Assistant Examiner* — Rachid Bendidi
(74) *Attorney, Agent, or Firm* — Nelson Mullins Riley & Scarborough LLP; Anthony A. Laurentano

(57) ABSTRACT

A navigation device for setting an appropriate navigation route based on a support route while reducing an amount of communicating information, is provided. The navigation server recognizes a departure position and a destination position of a user, and sets a support route connecting the departure position and the destination position, based on communication with the navigation device. The navigation device recognizes multiple links constituting a part of the support route, based on communication with the navigation server. The navigation device sets a navigation route including the links connecting the departure position and the destination position. The navigation device determines whether a deviation between a distance of an adjacent link pairs among the links along the support route and a distance thereof along the navigation route is equal to or less than a threshold value. The navigation route is output via an output device if the determination result is positive.

8 Claims, 3 Drawing Sheets

U.S. PATENT DOCUMENTS

| | | | |
|---|---|---|---|
| 6,249,740 B1 * | 6/2001 | Ito et al. | 701/420 |
| 6,324,467 B1 * | 11/2001 | Machii et al. | 701/420 |
| 6,381,536 B1 * | 4/2002 | Satoh et al. | 701/431 |
| 6,487,494 B2 * | 11/2002 | Odinak et al. | 701/420 |
| 6,581,004 B2 * | 6/2003 | Mori et al. | 701/420 |
| 6,594,580 B1 * | 7/2003 | Tada et al. | 701/532 |
| 6,671,617 B2 * | 12/2003 | Odinak et al. | 701/420 |
| 6,735,515 B2 * | 5/2004 | Bechtolsheim et al. | 701/532 |
| 6,801,850 B1 * | 10/2004 | Wolfson | 701/410 |
| 6,826,474 B2 * | 11/2004 | Miyahara et al. | 701/533 |
| 7,167,795 B2 * | 1/2007 | Hirose et al. | 701/423 |
| 7,353,108 B2 * | 4/2008 | Adachi | 701/410 |
| 7,590,490 B2 * | 9/2009 | Clark | 701/416 |
| 7,603,230 B2 * | 10/2009 | Suzuki et al. | 701/420 |
| 8,078,641 B2 * | 12/2011 | Mao et al. | 707/796 |
| 8,086,401 B2 * | 12/2011 | Adachi | 701/411 |
| 8,140,257 B2 * | 3/2012 | Villaume et al. | 340/945 |
| 8,219,317 B2 * | 7/2012 | Berot et al. | 701/425 |
| 2010/0030463 A1 * | 2/2010 | Tomizawa | 701/201 |
| 2010/0211309 A1 * | 8/2010 | Sugawara et al. | 701/201 |

FOREIGN PATENT DOCUMENTS

| | | |
|---|---|---|
| JP | 2000-155035 | 6/2000 |
| JP | 2002-318124 | 10/2002 |
| JP | 2003-14483 | 1/2003 |

* cited by examiner

NAVIGATION DEVICE AND NAVIGATION SYSTEM

RELATED APPLICATIONS

This application is a 35 U.S.C. 371 national stage filing of International Application No. PCT/JP2008/001763, filed Jul. 3, 2008, which claims priority to Japanese Patent Application No. 2007-177291 filed on Jul. 5, 2007 in Japan. The contents of the aforementioned applications are hereby incorporated by reference.

BACKGROUND OF THE INVENTION

1. Technical Field

The present invention relates to a navigation device which guides a user on the basis of communication with a navigation server, and a navigation server which supports the guiding of the user via the navigation device, on the basis of communication with the navigation device, and the like.

2. Description of the Related Art

Conventionally, there has been proposed a technique of searching for a support route corresponding to a searching condition by a navigation device, and outputting information representing a part of the support route (points such as an intersection) (refer to Japanese Patent Laid-Open No. 2000-155035). Further, there has been proposed a technique of searching for a support route by a navigation server receiving a request from a navigation device, and transmitting the support route information to the navigation device (refer to Japanese Patent Laid-Open No. 2000-055682).

However, in the case where a navigation route diverges from the support route, even though the navigation route is set based on information representing a part of the support route by the navigation device, there is a possibility that the meaning of the navigation server's support with respect to the guiding of the user becomes sparse. On the other hand, it is conceivable to increase the amount of communicating information between the navigation server and the navigation device in order to bring the navigation route closer to the support route. However, there is a possibility that the setting of the navigation route is delayed from increase in the communicating time, and also the communication cost is increased.

SUMMARY OF THE INVENTION

In view of the above circumstances, an object to be solved by the present invention is to provide a navigation device and the like capable of setting an appropriate navigation route and the like, in view of a support route set by a navigation server, while restraining an amount of communicating information small.

According to a first aspect of the present invention, there is provided a navigation device which guides a user on the basis of communication with a navigation server, comprising: a navigation map storing unit which stores a navigation map information; a first processing unit which makes the navigation server recognize a departure position and a destination position of the user on the basis of communication with the navigation server, and which recognizes a plurality of links constituting a part of a support route set by the navigation server which connects the departure position and the destination position; a second processing unit which sets a navigation route including a plurality of the links which connects the departure position and the destination position, on the basis of the navigation map information stored in the navigation map storing unit and a plurality of the links recognized by the first processing unit; and a third processing unit which determines whether or not a deviation between a distance of an adjacent link pair among a plurality of the links along the support route set by the first processing unit and a distance thereof along the navigation route set by the second processing unit is equal to or smaller than a threshold value, and which outputs the navigation route via the output device on condition that the determination result is positive.

According to the navigation device of the first aspect of the invention, the navigation route may be set on the basis of a plurality of the links constituting a part of the support route which is set by the navigation server. Therefore, by restraining the number of the links, it becomes possible to restrain the amount of communicating information and communicating time, and save communication cost between the navigation server and the navigation device.

Further, on the basis of the comparison result of the distances along the support route set by the navigation server and the navigation route set by the navigation device, respectively, of the adjacent link pairs that are common in the support route set by the navigation server and the navigation route set by the navigation device, the appropriateness of the navigation route in view of the support route may be determined. This determination method is a determination method taking into consideration that the deviation of the distances becomes smaller as the reproducibility of the support route by the navigation device becomes higher, that is, as the degree of approximation of the navigation route set by the navigation device with respect to the support route becomes higher. And, on condition that the determination result is positive, the navigation route appropriate in view of the support route may be recognized by the user via the output device.

Therefore, according to the navigation device of the first aspect of the invention, it becomes possible to output the appropriate navigation route in view of the support route set by the navigation server, while restraining the amount of communicating information small.

The navigation device of a second aspect of the invention, is the navigation device of the first aspect of the invention, wherein the first processing unit recognizes a new plurality of the links constituting a part of the support route on the basis of communication with the navigation server, on condition that the determination result by the third processing unit is negative.

According to the navigation device of the second aspect of the invention, on condition that the determination result is negative, a new plurality of the links constituting a part of the support route is recognized. Therefore, it becomes possible to reconfigure the navigation route on the basis of a new plurality of the links, and to newly determine the appropriateness of the reconfigured navigation route. Further, it becomes possible to set and output the appropriate navigation route in view of the support route set by the navigation server, while restraining the amount of communicating information small.

The navigation device of a third aspect of the invention, is the navigation device of the first aspect of the invention, wherein the first processing unit recognizes the threshold value for each of the adjacent link pairs among a plurality of the links constituting a part of the support route, on the basis of communication with the server.

According to the navigation device of the third aspect of the invention, it becomes possible to vary the threshold value of the deviation of the distance between the link pairs according to the difference of the importance or necessity of individual link constituting a part of the support route. For example, it becomes possible to set the threshold value of one link pair which exists in an area with high necessity for the user to pass therethrough from a certain view point smaller than the threshold value of the other link pairs which exists outside the area. In this case, the reproducibility of the support route between the one link pair may be set to be higher than the reproducibility of the support route between the other link pairs. Further, it becomes possible to make the user pass through along a route which is closest to the support route as possible, in the area.

The navigation device of a fourth aspect of the invention, is the navigation device of the first aspect of the invention, wherein the first processing unit makes the navigation server set the support route according to a setting mode of the support route input by the user via an input device, by transmitting the setting mode to the navigation server.

According to the navigation device of the fourth aspect of the invention, it is possible to determine the appropriateness of the navigation route in view of the setting mode of the support mode, in addition to the support mode, and to output the navigation route on the basis of the determination result.

In a navigation server according to a fifth aspect of the invention, there is provided a navigation server which supports guiding of a user via a navigation device on the basis of communication with the navigation device, comprising: a support map storing unit which stores a support map information; a first support processing unit which recognizes a departure position and a destination position of the user on the basis of communication with the navigation device, and which sets a support route which connects the departure position and the destination position, on the basis of the support map information stored in the support map storing unit; and a second support processing unit which makes the navigation device recognize a plurality of links constituting a part of the support route set by the first support processing unit, on the basis of communication with the navigation device.

According to the navigation server of the fifth aspect of the invention, it becomes possible to output the appropriate navigation route by the navigation device or the like in view of the support route which connects the departure position and the destination position of the user of the navigation device, while restraining the amount of communicating information small.

A navigation system of a sixth aspect of the invention is configured from the navigation device according to the first aspect of the invention and the navigation server according to the fifth aspect of the invention.

According to the navigation system of the sixth aspect of the invention, it becomes possible to output the appropriate navigation route by the navigation device or the like in view of the support route set by the navigation server, while restraining the amount of communicating information between the navigation device and the navigation server small.

DETAILED DESCRIPTION OF THE PREFERRED EMBODIMENTS

An embodiment of a navigation system according to the present invention will now be explained below with reference to the accompanying drawings.

Figure 1:
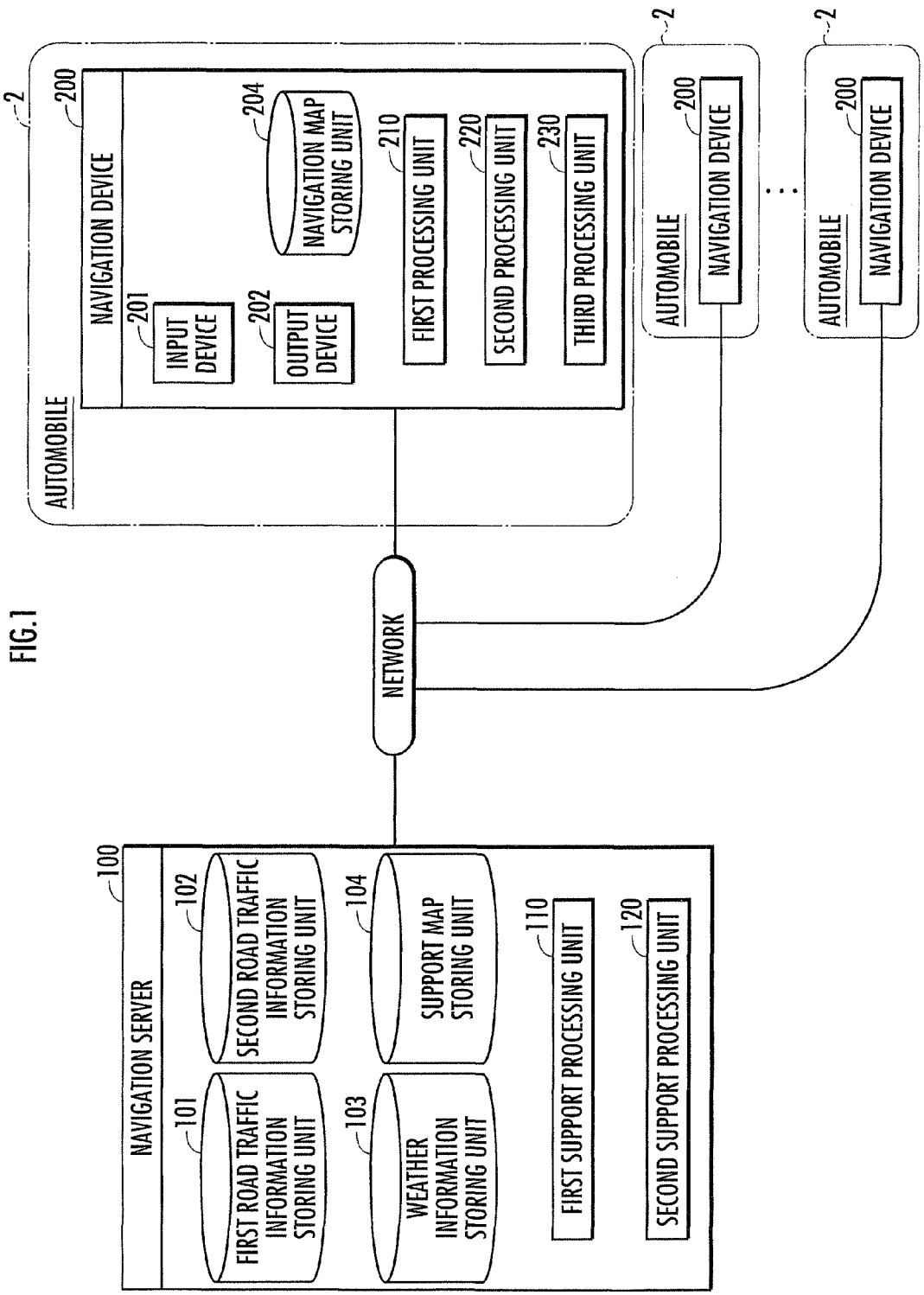
FIG. 1 is a view explaining the configuration of a navigation system according to the present invention.

The configuration of the navigation system of the present invention will be described below with reference to FIG. 1. The navigation system is configured from a navigation server 100, and a navigation device 200 mounted on an automobile 2. It should be noted that the navigation device 200 may be mounted in a mobile device other than an automobile. It is also acceptable for the navigation device 200 to be carried by a user.

The navigation server 100 is configured from one or a plurality of server computers. The navigation server 100 is equipped with a first road traffic information storing unit 101, a second road traffic information storing unit 102, a weather information storing unit 103, a support map storing unit 104, a first support processing unit 110, and a second support processing unit 120.

The first road traffic information storing unit 101 is stored with a first road traffic information (required moving time, existence or not of a traffic jam and the like in individual link) based on a probe information (position of respective probe car at each time) transmitted or uploaded from the navigation device 200 mounted on the automobile 2 as a probe car or a floating car to the navigation server 100.

A second road traffic information storing unit 102 is stored with a second road traffic information (required moving time, existence or nonexistence of a traffic jam and the like in individual link, and also information representing existence or nonexistence of traffic regulations in individual link, and information representing the existence or nonexistence of an event in the vicinity of individual link and the type of the event, or the like) transmitted from a road traffic information center server and the like to the navigation server 100.

A weather information storing unit 103 is stored with a weather information and the like in the vicinity of individual link transmitted from a weather information center server and the like to the navigation server 100.

The support map storing unit 104 is stored with a support map information. In the support map information, the location, shape and posture or the like of an individual link constituting a road are expressed by a series of coordinates ((latitude, longitude), or (latitude, longitude, altitude)). Moreover, individual link is tagged with link identifier for identifying individual link, and data representing the road type.

The first support processing unit 110 recognizes a departure position $p_1$ and a destination position $p_2$ of the automobile 2 (or a user) on which the navigation device 200 is mounted, on the basis of communication with the navigation device 200. On the basis of the first road traffic information stored in the first road traffic information storing unit 101, the second road traffic information stored in the second road traffic information storing unit 102, the weather information and the like stored in the weather information storing unit 103, and the support map information stored in the support map storing unit 104, the first support processing unit 110 sets a support route R which connects the departure position $p_1$ and the destination position $p_2$.

The second support processing unit 120 makes the navigation device 200 recognize a plurality of the links constituting a part of the support route R set by the first support processing unit 110 and the like, on the basis of communication with the navigation device 200.

The navigation device 200 is comprised of an ECU or a computer mounted in the automobile 2 as hardware, and a navigation program which is stored in a memory and which provides the computer with various functions as software. The navigation program may be pre-installed in the memory (ROM) in the vehicular computer, or a part of or all of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation device 200 is equipped with an input device 201, an output device 202, a navigation map storing unit 204, a first processing unit 210, a second processing unit 220, and a third processing unit 230.

The input device 201 is comprised of operating buttons or a microphone disposed in a center console or the like of the automobile 2, and enables a user to perform various settings by operation or voice output. The output device 202 is a display device disposed in the center console of the automobile 2 for displaying or outputting navigation map information and the like. The navigation map storing unit 204 is stored with the navigation map information or the like to be output to the output device 202. In the navigation map information, the location, shape and posture or the like of an individual link constituting a road are expressed by a series of coordinates. Moreover, individual link is tagged with the link identifier for identifying individual link. Even though the definitions of the coordinates and the like in the navigation map information and the support map information are different due to the different specifications and data architectures therebetween, it is possible to match the links by tagging the identical links with common link identifier.

The first processing unit 210 makes the navigation server 100 recognize the departure position $p_1$, and the destination position $p_2$ input by the user through the input device 201 of the automobile 2, on the basis of communication with the navigation server 100. The first processing unit 210 recognizes a plurality of the links constituting a part of the support route R which connects the departure position $p_1$ and the destination position $p_2$ set by the navigation server 100, on the basis of communication with the navigation server 100.

The second processing unit 220 sets a navigation route r which includes a plurality of the links and which connects the departure position $p_1$ and the destination position $p_2$, on the basis of the navigation map information stored in the navigation map storing unit 204 and a plurality of the links recognized by the first processing unit 210.

With respect to each adjacent link pairs i (i=1, 2, . . . ) among a plurality of the links, the third processing unit 230 determines whether or not a deviation between a distance $d_1$ along the support route R set by the first processing unit 210 and a distance $d_{2i}$ along the navigation route r set by the second processing unit 220 is equal to or less than a threshold value $\epsilon_i$. On condition that the determination result is positive, the third processing unit 230 outputs the navigation route r via the output device 202. On the other hand, on condition that the determination result is negative, the third processing unit 230 recognizes a new plurality of the links constituting a part of the support route R, on the basis of communication with the navigation server 100.

It should be noted that the term a component as a hardware "recognizes" information means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. Further, it should also be noted that the term a component as the hardware "outputs" information means that the component outputs information in all possible forms enabling a human being recognize the same via five senses such as visual perception, auditory perception, tactile perception and the like, for example, the component displays, auditory outputs, vibratory outputs the information and the like.

The function of the navigation system with the above-mentioned configuration will be explained below.

Figure 2:
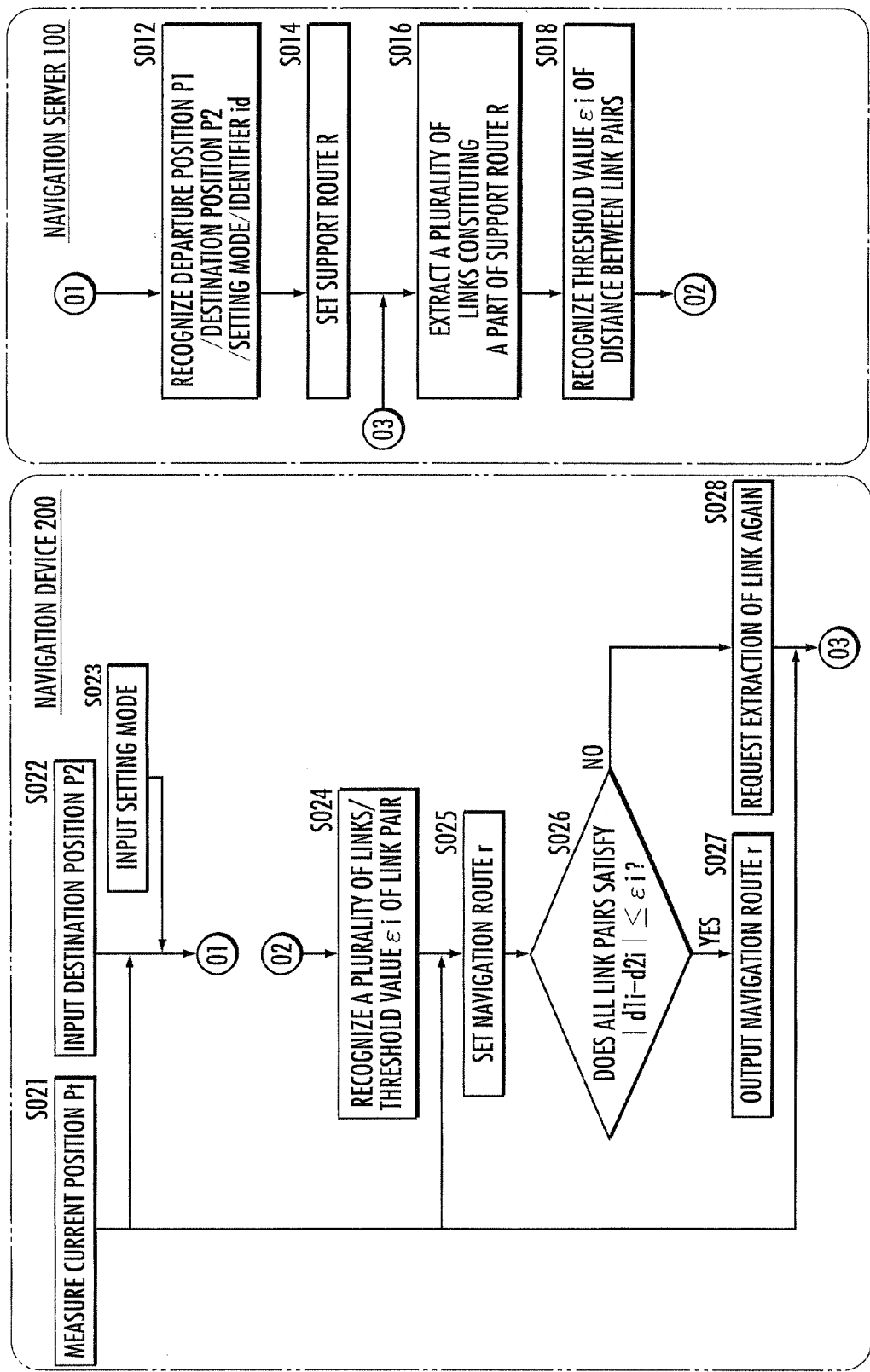
FIG. 2 is a view explaining the function of the navigation system according to the present invention.

In the navigation device 200, the first processing unit 210 measures a current position $p_t$ of the automobile 2 at regular intervals, on the basis of a GPS signal received by a communication device, or outputs from an acceleration sensor and rate sensor or the like mounted on the automobile 2 (FIG. 2/S021). Further, the destination position $p_2$ of the automobile 2 is input by the user via the input device 201 (FIG. 2/S022). Still further, a setting mode of the support route R at the navigation server 100 is input by the user via the input device 201 (FIG. 2/S023). The setting mode includes a mode which sets the support route R having the shortest moving distance to the destination position $p_2$, a mode which sets the support route R having the shortest predicted required time until the destination position $p_2$, or a mode which sets the support route R predicted as having the best fuel consumption of the automobile 2 in traveling to the destination position $p_2$, and the like.

The destination position $p_2$ of the automobile 2, and the current position $p_t$ (the departure position $p_1$) of the automobile 2 at either one of or both of the input point of time of the destination position $p_2$ and the setting mode are transmitted by the first processing unit 210 to the navigation server 100 along with the navigation identifier id for identifying the navigation device 200.

Correspondingly, in the navigation server 100, the first support processing unit 110 recognizes the departure position $p_1$ and the destination position $p_2$ of the automobile 2, the setting mode, and the navigation identifier id for identifying the navigation device 200 (FIG. 2/S012). Further, the first support processing unit 110 sets the support route R which connects the departure position $p_1$ and the destination position $p_2$ of the automobile 2 as shown in FIG. 3(a), according to the setting mode and on the basis of the support map information stored in the support map storing unit 104 (FIG. 2/S014).

Further, the n+1 links (for example, n=9) constituting the support route R set by the first support processing unit 110 are extracted by the second support processing unit 120 (FIG. 2/S016). The number of links to be extracted is set according to the communication function between the navigation server 100 and the navigation device 200, such as the number of links capable of being recognized by the navigation device 200 during one communication with the navigation server 100. As is shown in FIG. 3(a), the n+1 links set a link deviating from a first range $S_1$, which takes the departure position $p_1$ as reference, as the initial link, and set a link deviating from a second range $S_2$, which takes the destination position $p_2$ as reference, as the rearmost link. The shape and size of each of the first range $S_1$ and the second range $S_2$ may be set arbitrarily. Here, it may be configured that the information indicating the version of the navigation map information is transmitted or uploaded from the navigation device 200 to the navigation server 100; correspondingly, the navigation server 100 determines whether or not the links are included in the navigation map information of that version; and in case where the determination result is negative, the links are extracted again. Further, it may be configured that the navigation server 100 selects the support map information of the version coinciding with the version of the navigation map information from a plurality of versions of the support map information stored in the support map storing unit 104, and the links are extracted from the selected support map information.

Further, a second support processing unit 120 reads or recognizes the threshold value $\epsilon_i$ (i=1, 2, . . . , n) corresponding to adjacent first through n-th link pairs among the n+1 links, respectively, from the support map storing unit 104 (FIG. 2/S018). Here, it may be set so that the threshold value $\epsilon_i$ varies according to the variation of the setting mode, such as setting the threshold value $\epsilon_i$ according to the degree of likelihood to be traveled in order to shorten the required moving time, in the setting mode which gives priority to the required moving time. The threshold value $\epsilon_i$ may be uniformly set to a part of or all of the link pairs.

Figure 3:
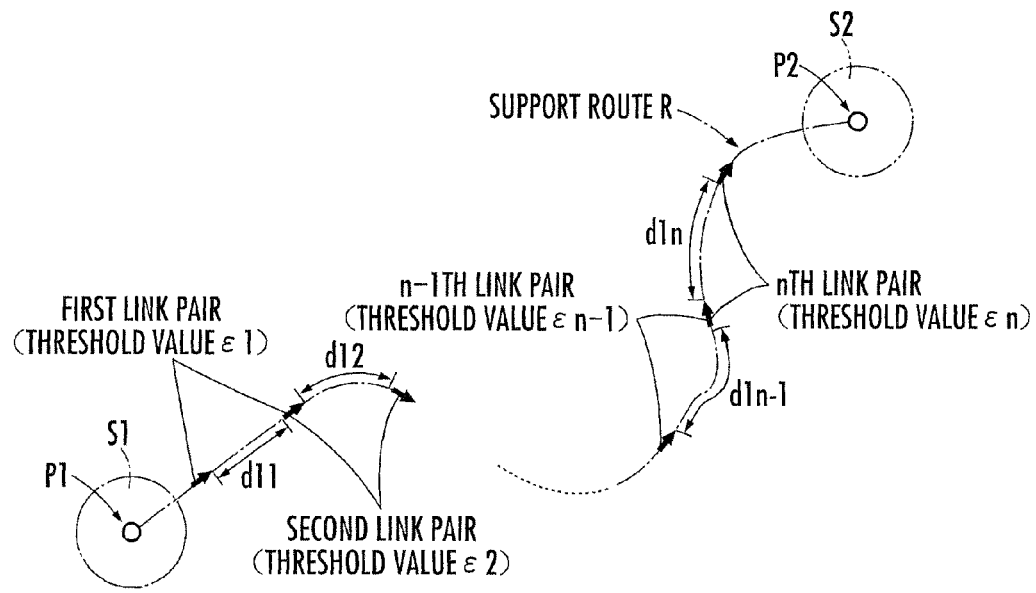
FIG. 3 is a view explaining a support route and a navigation route.
Figure 3:
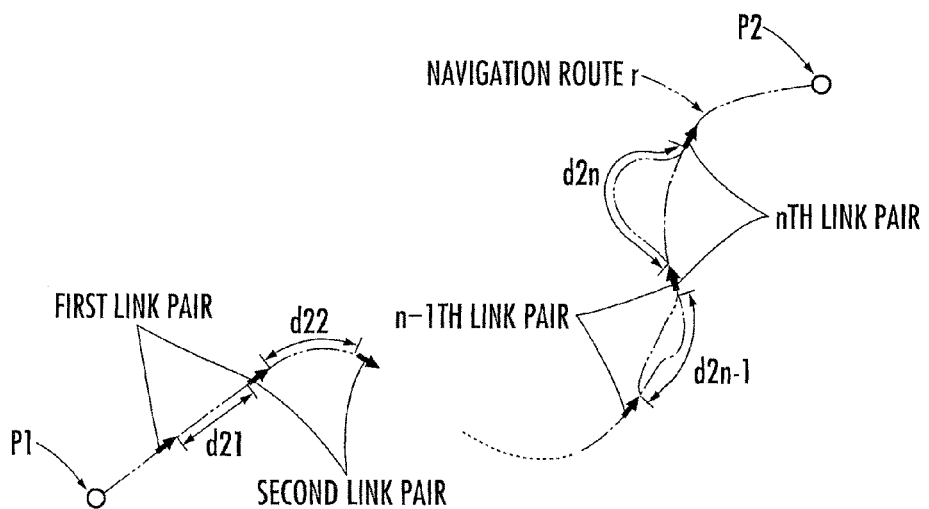

Moreover, the second support processing unit 120 transmits the link identifier of individual link and the information or data representing the threshold value $\epsilon_i$, to the navigation device 200 identified by the navigation identifier id which is recognized by the first support processing unit 110. Correspondingly, in the navigation device 200, the second processing unit 220 recognizes individual link and the threshold value $\epsilon_i$ (FIG. 2/S024). Further, the second processing unit 220 sets the navigation route r which connects the departure position $p_1$ and the destination position $p_2$ including the n+1 links, on the basis of the n+1 links, the navigation map information stored in the navigation map storing unit 204, and the departure position $p_1$ and the destination position $p_2$ of the automobile 2, as is shown in FIG. 3 (b) (FIG. 2/S025). Here, in the case where the current position $p_t$ of the automobile 2 deviates from the position $p_1$ at the time of input of the destination position $p_2$ or the like because the automobile 2 has started to travel, the navigation route r may be set by taking the current position $p_t$ as the new departure position. Moreover, in addition to the navigation route r, icons representing the current position $p_t$ and the direction of movement of the automobile 2 or the like are output or displayed through the output device 202 along with navigation map information indicating the road and facilities.

Further, the third processing unit 230 determines whether or not all of the first through n-th link pairs satisfies the requirement that magnitude of the deviation between the distance $d_{1i}$ along the support route R and distance $d_{2i}$ along the navigation route r is equal to or less than the threshold value $\epsilon_i$, as is represented by an in equation (1) (FIG. 2/S026).

$$|d_{1i} - d_{2i}| \leq \epsilon_i \quad (1)$$

Here, in place of or in addition to the in equation (1), it may be determined whether or not an average value of the deviation $(d_{1i} - d_{2i})$ of k link pairs (k≦n) is equal to or less than an average value of the threshold value $\epsilon_i$, as is represented by an in equation (2).

$$\Sigma_i (d_{1i} - d_{2i})/k \leq \Sigma_i \epsilon_i / k \quad (2)$$

If the determination result is negative (FIG. 2/S026 . . . NO), then the first processing unit 210 requests to the navigation server 100 to extract again a plurality of the links constituting the support route R, while setting the current position $p_t$ of the automobile 2 as at that time a new departure position $p_1$ (FIG. 2/S028). In the case where a plurality of the navigation routes r are set by a navigation device 200, the determination is carried out for each of a plurality of the navigation routes r, and a plurality of the links are extracted again on condition that the determination results are all negative. Correspondingly, the above-described processes are repeated, such as extracting a new n+1 links at the navigation server 100, and setting a new navigation route r on the basis of the new n+1 links at the navigation device 200. On the other hand, in the case where the determination result is positive (FIG. 2/S026 . . . YES), the third processing unit 230 outputs or displays the navigation route r via the output device 202 (FIG. 2/S027).

Here, in the case where a plurality of the navigation routes r are set at the navigation device 200, it may be configured that the navigation device 200 selects one navigation route r in which the magnitude of the deviation between the distance $d_{1i}$ along the support route R and the distance $d_{2i}$ along each of a plurality of the navigation routes r, or the average value of the deviation thereof is the smallest, and outputs the selected navigation route r.

Further, it may be configured that the navigation device 200 transmits or uploads the link identifier of individual link of the navigation route r to the navigation server 100, and the determination on the fulfillment of the above-described requirement in relation to the magnitude of the deviation between the distance $d_{1i}$ along the support route R and the distance $d_{2i}$ along the navigation route r (refer to FIG. 2/S026) is carried out at the navigation server 100 by the second support processing unit 120. In the case where the determination result is positive, the output of the navigation route r at the navigation device 200 may be allowed (refer to FIG. 2/S027), and on the other hand when the determination result is negative, the link may be extracted again (refer to FIG. 2/S016).

According to the navigation system exerting the above-described functions, the navigation route r may be set on the basis of a plurality of the links constituting a part of the support route R set by the navigation server 100 (refer to FIG. 3 (a) and (b)). Therefore, by restraining the number of the links, it becomes possible to restrain the amount of communicating information and communicating time, and save communication cost between the navigation server 100 and the navigation device 200.

Further, on the basis of the comparison result of the distance $d_{1i}$ and $d_{2i}$ along the support route R set by the navigation server 100 and the navigation route r set by the navigation device 200, respectively, of the adjacent link pairs that are common in the support route R set by the navigation server 100 and the navigation route r set by the navigation device 200, the appropriateness of the navigation route r in view of the support route R may be determined (refer to FIG. 2/S026, FIG. 3(a) and (b)). This determination method is a determination method taking into consideration that the deviation $(d_{1i} - d_{2i})$ of the distances becomes smaller as the reproducibility of the support route R by the navigation device 200 becomes higher, that is, as the degree of approximation of the navigation route r set by the navigation device 200 with respect to the support route R becomes higher. And, on condition that the determination result is positive, the navigation route r appropriate in view of the support route R may be recognized by the user via the output device 202 (refer to FIG. 2/S027, FIG. 3(b)). On the other hand, on condition that the determination result is negative, a new plurality of the links constituting a part of the support route R is recognized by the navigation device 200 (refer to FIG. 2/S028, S016, S018, S024). Therefore, it becomes possible to reconfigure the navigation route r on the basis of a new plurality of the links, and to newly determine the appropriateness of the reconfigured navigation route r.

Therefore, it becomes possible to set and output the appropriate navigation route r by the navigation device 200 in view of the support route R set by the navigation server 100, while restraining the amount of communicating information small.

Further, it becomes possible to vary the threshold value $\epsilon_i$ of the deviation of the distance between the link pairs ($d_{1i}$–$d_{2i}$) according to the difference of the importance or necessity and the like of individual link constituting a part of the support route R (refer to FIG. 2/S018, FIG. 3(a)). For example, it becomes possible to set the threshold value of one link pair which exists in an area with high necessity for the user to pass therethrough from the view point of saving the moving cost (time, distance, toll fare, energy consumption) to the destination position $p_2$ and the like smaller than the threshold value of the other link pairs which exists outside the area. In this case, the reproducibility of the support route between the one link pair may be set to be higher than the reproducibility of the support route between the other link pairs. Further, it becomes possible to make the user pass through along a route which is closest to the support route as possible, in the area.

Further, the links included in the first range $S_1$ are omitted from the target of extraction (refer to FIG. 3(a)). This is from taking into account that, in the case where the user has moved and departed from the departure position $p_1$ during the time in which the links constituting the support route R is first recognized by the navigation device 200, there is little necessity of making the navigation device 200 recognize the links in the vicinity of the departure position $p_1$ from the view point of guiding the user to the destination position $p_2$. Still further, the links included in the second range $S_2$ taking the destination position $p_2$ as reference are omitted from the target of extraction (refer to FIG. 3(a)). This is from taking into account that, in the case where the user exists in the vicinity of the destination position $p_2$, there is little necessity of making the navigation device 200 recognize the links constituting the support route R in the vicinity of the destination position $p_2$. Therefore, it become possible to reduce the number of extracted links, and consequently, to enable conservation of communication cost, omission of expanding of communication functions, allotting of the capacity of the arithmetic processing required for the information processing in relation to communication to other information processing, and allotting of the memory capacity for such information to memorizing other information, or the like.

FIG. 1

100: navigation server
101: first road traffic information storing unit
102: second road traffic information storing unit
103: weather information storing unit
104: support map storing unit
110: first support processing unit
120: second support processing unit
2: automobile
200: navigation device
201: input device
202: output device
204: navigation map storing unit
210: first processing unit
220: second processing unit
230: third processing unit

FIG. 2

200: navigation device
S021: measure current position pt
S022: input destination position p2
S023: input setting mode
S024: recognize a plurality of links/threshold value Ei of link pair
S025: set navigation route r
S026: does all link pairs satisfy 数式
S027: output navigation route r
S028: request extraction of link again
100: navigation server
S012: recognize departure position p1/destination position p2/setting mode/identifier id
S014: set support route R
S016: extract a plurality of links constituting a part of support route R
S018: recognize threshold value ϵi of distance between link pairs

FIG. 3(a)

first link pair (threshold value ϵ1)
second link pair (threshold value ϵ2)
n-1th link pair (threshold value ϵn-1)
nth link pair (threshold value ϵn)
support route R

FIG. 3(b)

first link pair
second link pair
n-1th link pair
nth link pair
navigation route r

The invention claimed is:

1. A navigation device which guides a user on the basis of communication with a navigation server, comprising:
  a navigation map storing unit which stores a navigation map information;
  a first processing unit which makes the navigation server recognize a departure position and a destination position of the user on the basis of communication with the navigation server, and which recognizes a plurality of links constituting a part of a support route set by the navigation server which connects the departure position and the destination position;
  a second processing unit which sets a navigation route including a plurality of the links which connects the departure position and the destination position, on the basis of the navigation map information stored in the navigation map storing unit and a plurality of the links recognized by the first processing unit; and
  a third processing unit which determines whether or not a deviation between a distance of an adjacent link pair among a plurality of the links along the support route set by the first processing unit and a distance thereof along the navigation route set by the second processing unit is equal to or smaller than a threshold value, and which outputs the navigation route via the output device on condition that the determination result is positive.

2. The navigation device according to claim 1, wherein the first processing unit recognizes a new plurality of the links constituting a part of the support route on the basis of communication with the navigation server, on condition that the determination result by the third processing unit is negative.

3. The navigation device according to claim 1, wherein the first processing unit recognizes the threshold value for each of the adjacent link pairs among a plurality of the links constituting a part of the support route, on the basis of communication with the navigation server.

4. The navigation device according to claim 1, wherein the first processing unit makes the navigation server set the support port route according to a setting mode of the support route input by the user via an input device, by transmitting the setting mode to the navigation server.

5. A navigation system configured from a navigation server and a navigation device which guides a user on the basis of communication with the navigation server,
the navigation device comprising:
a navigation map storing unit which stores a navigation map information;
a first processing unit which makes the navigation server recognize a departure position and a destination position of the user on the basis of communication with the navigation server, and which recognizes a plurality of links constituting a part of a support route set by the navigation server which connects the departure position and the destination position;
a second processing unit which sets a navigation route including a plurality of the links which connects the departure position and the destination position, on the basis of the navigation map information stored in the navigation map storing unit and a plurality of the links recognized by the first processing unit; and
a third processing unit which determines whether or not a deviation between a distance of an adjacent link pair among a plurality of the links along the support route set by the first processing unit and a distance thereof along the navigation route set by the second processing unit is equal to or smaller than a threshold value, and which outputs the navigation route via the output device on condition that the determination result is positive;
the navigation server comprising:
a support map storing unit which stores a support map information;
a first support processing unit which recognizes the departure position and the destination position of the user on the basis of communication with the navigation device, and which sets a support route which connects the departure position and the destination position, on the basis of the support map information stored in the support map storing unit; and
a second support processing unit which makes the navigation device recognize the plurality of links constituting a part of the support route set by the first support processing unit, on the basis of communication with the navigation device.

6. The navigation system according to claim 5, wherein the first processing unit recognized a new plurality of the links constituting a part of the support route on the basis of communication with the navigation server, on condition that the determination result by the third processing unit is negative.

7. The navigation system according to claim 5, wherein the first processing unit recognizes the threshold value for each of the adjacent link pairs among a plurality of the links constituting a part of the support route, on the basis of communication with the navigation server.

8. The navigation system according to claim 5, wherein the first processing unit makes the navigation server set the support route according to a setting mode of the support route input by the user via an input device, by transmitting the setting mode to the navigation server.

* * * * *